(12) United States Patent
Bates (10) Patent No.: US 7,004,160 B1
(45) Date of Patent: Feb. 28, 2006

(54) PORTABLE OUTDOOR COOKING APPARATUS

(76) Inventor: John C. Bates, 9923 Canyon View, Summerland, British Columbia (CA) V0H 1Z0

( * ) Notice: Subject to any disclaimer, the term of this patent is extended or adjusted under 35 U.S.C. 154(b) by 129 days.

(21) Appl. No.: 10/791,071

(22) Filed: Mar. 2, 2004

Related U.S. Application Data (60) Provisional application No. 60/451,470, filed on Mar. 3, 2003.

(51) Int. Cl.
*F24B 3/00* (2006.01)

(52) U.S. Cl. .......................... 126/30; 126/9 R (58) Field of Classification Search .................. 126/30, 126/9 R, 25 R, 25 A, 25 AA, 9 B, 11; 248/156
See application file for complete search history.

(56) References Cited

U.S. PATENT DOCUMENTS

| | | | | |
|---|---|---|---|---|
| 192,011 A | * | 6/1877 | Richardson | 126/30 |
| 2,827,846 A | * | 3/1958 | Karkling | 99/339 |
| 3,152,536 A | * | 10/1964 | Lucas | 99/397 |
| 3,537,388 A | * | 11/1970 | Martin | 99/421 V |
| 3,785,360 A | * | 1/1974 | Martin | 126/30 |
| 4,589,399 A | * | 5/1986 | Hamill et al. | 126/30 |
| 4,856,423 A | * | 8/1989 | Burns | 99/421 H |
| 5,666,940 A | * | 9/1997 | Kreiter | 126/30 |
| 5,848,584 A | * | 12/1998 | Brog | 126/30 |
| 5,944,009 A | * | 8/1999 | Scheller | 126/30 |
| 6,006,740 A | * | 12/1999 | Ulrickson et al. | 126/29 |
| 6,070,571 A | | 6/2000 | Bradbury | |
| 6,386,192 B1 | | 5/2002 | Weber | |
| 6,640,797 B1 | | 11/2003 | Magers | |

* cited by examiner

*Primary Examiner*—Alfred Basichas
(74) *Attorney, Agent, or Firm*—Martin G. Ozinga; Philips McFall McCaffrey McVay, Murrah, P.C.

(57) ABSTRACT

A portable outdoor cooking apparatus comprising a cooking surface having a first receiver and a second receiver, a frame hingedly attached to the cooking surface wherein the frame comprises a positioning ring and a handle and the handle weighs less than the cooking surface, and a post comprising a first segment and a second segment wherein the first segment removably attaches for storage to the cooking surface first receiving port and the second segment removably attaches to the cooking surface second receiving port for storage and wherein the first segment and said second segment removably attach to form the post, and the post removably attaches to the positioning ring to position the cooking surface along the post.

14 Claims, 6 Drawing Sheets

PORTABLE OUTDOOR COOKING APPARATUS

CROSS-REFERENCE TO RELATED APPLICATIONS

Priority is claimed from provisional patent application U.S. Ser. No. 60/451,470, filed on Mar. 3, 2003, and incorporated by reference herein.

BACKGROUND OF THE INVENTION

1. Field of the Invention

The present invention relates generally to portable outdoor cooking equipment. More particularly, the present invention is a new and improved cooking apparatus that is easily transported, can be quickly assembled, provides a variety of cooking configurations, allows for selective positioning over a fire, and can be quickly disassembled and stored.

2. Description of the Known Prior Art

In outdoor cooking, it is common for campers and outdoorsman to rely on what they find in the wilderness as a heating and cooking source. Gathered wood is most commonly the fuel due to the impracticability of finding or carrying charcoal or natural gas. Needless to say, the wood found is often of varying sizes, shapes, and variety. Therefore, most cooking is done over dug out pits generally arranged for the size of fire desired and availability and quality of wood.

Outdoor enthusiasts have long struggled to find the ideal cooking equipment to use in remote locations where it is undesirable or impractical to use conventional relatively non-portable grills typically found in most residential back yards or the existing portable equipment currently found on the camping market. Although many grill assemblies and portable cooking devices are known for camping and such events as tailgate parties, these known devices lack convenience, flexibility in cooking options, and simplicity of operation. Furthermore, the portable devices specifically designed for camping frequently sacrifice stability to be lightweight enough for camping and are extremely difficult to set up over large fire pits.

Because of the popularity of outdoor cooking, it is desirable to provide equipment that may be used for a wide variety of options such as in hiking, tailgate parties or even the backyard.

Unfortunately, due to the general nature of outdoor cooking, most equipment is designed in accordance with a single type of fire source in mind. Typically, charcoal and natural gas grills use compartments to contain the fire source whereas natural wood fires require an open pit arrangement for the simple fact that wood is too large and irregularly sized to fit into prefabricated containers. It is therefore desirable to provide outdoor cooking grills and equipment that provides flexibility for different size fires, and fire pits, and may be used with charcoal or wood of any size or shape.

Unfortunately, most current products still typically fall into two general classifications.

The first being typically rudimentary lightweight equipment often designed for backpackers who need very light weight equipment due to the need for carrying the equipment over potentially long distances. These types of devices are often very unsteady due to their lightweight construction as previously mentioned and have very limited application options. Furthermore, these types lack any method for adjusting height over the flame after being set up or once the fire has started.

The other general class is essentially heavier duty devices that more closely resemble equipment found in backyards. Obviously these types are less convenient to transport due to their heavier construction and frequently too bulky for use by backpackers. Although, several known types do somewhat disassemble for transportation, none currently allow for use with wood normally found and utilized in camping. Also these types may be extremely difficult to break down and often require substantial effort to stabilize on rough terrain.

Thus, there is a need for a new and improved portable cooking apparatus that provides convenience, flexibility for a variety of operations, and is easily transportable. Whereas the prior art has failed to meet the needs and desires of consumers, the present invention is a portable outdoor cooking apparatus that provides numerous cooking arrangements and options and is still readily transportable.

SUMMARY OF THE INVENTION

In general, the present invention is a new and improved portable outdoor cooking apparatus which provides an adjustable height for a cooking surface over a heating source and works cooperatively with interchangeable cooking methods. The present invention also provides an independent stand, which allows the apparatus to be used on a variety of terrains as well as on an optional prefabricated container for holding a heating source. Still further, the present invention provides for multiple cooking features while folding generally flat for storage and travel.

In this respect, before explaining at least one embodiment of the invention in detail, it is to be understood that the invention is not limited in this application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable outdoor cooking apparatus that is easily transportable for camping as well as provide optional embodiments for use on multiple terrains and heating sources.

It is a further object of the present invention to provide a new and improved portable outdoor cooking apparatus which may be easily and efficiently manufactured and marketed.

An even further object of the present invention is to provide a new and improved portable outdoor cooking apparatus which is of a more durable and reliable construction than that of the existing known art.

Still another object to the present invention to provide a new and improved portable outdoor cooking apparatus which is susceptible of a low cost of manufacture with regard to both materials and labor, which accordingly is then susceptible of low prices of sale to the consuming public, thereby making such economically available to the buying public.

Another object of the present invention is to provide a new and improved portable outdoor cooking apparatus which provides some of the advantages of the prior art, while simultaneously overcoming some of the disadvantages normally associated therewith.

Yet another object of the present invention to provide a new and improved portable outdoor cooking apparatus that provides multiple cooking methods such as but not limited to grilling, frying, baking, and rotisserie.

Still yet another object of the present invention is to provide a new and improved portable outdoor cooking apparatus that provides a cooking surface with a means for adjusting the height over a heating source without the need for complex locking mechanisms.

A further object of the present invention is to provide a new and improved portable outdoor cooking apparatus, which uses friction and gravity as a mechanical advantage for setting the cooking surface height.

Still another object of the present invention is to provide a new and improved portable outdoor cooking apparatus which serves several utilitarian outdoor functions such as a preparation surface or table with an adjustable height. It is still further contemplated that the invention may also serve as a chair with an adjustable height for hunting and camping.

An even further object of the present invention is to provide a new and improved portable outdoor cooking apparatus which folds down generally flat for transportation and storage while still provides multiple configurations for cooking.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings and descriptive matter in which there are illustrated preferred embodiments of the invention.

BRIEF DESCRIPTION OF THE DRAWINGS AND PICTORIAL ILLUSTRATIONS

DETAILED DESCRIPTION OF THE PREFERRED EMBODIMENTS

Figure 1:
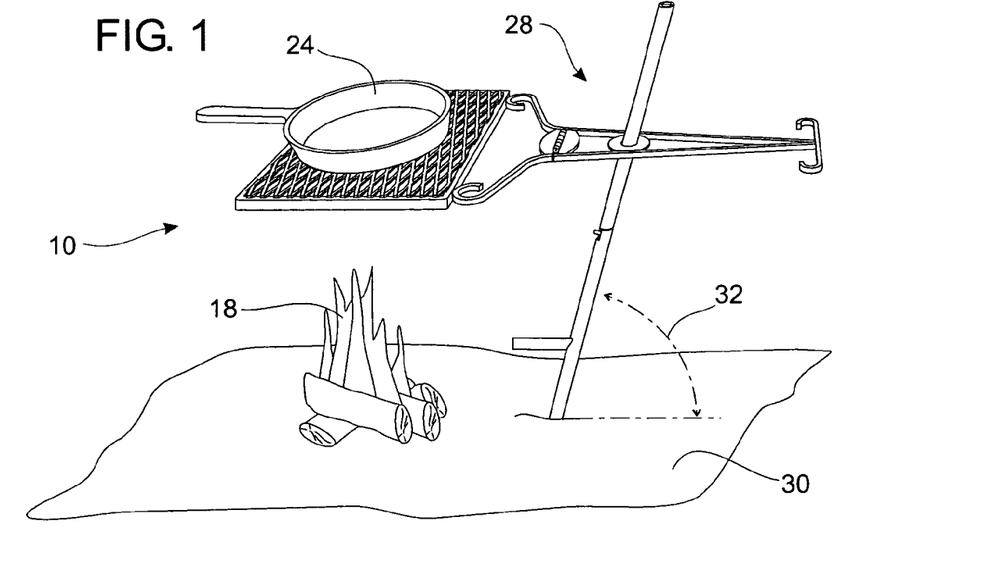
FIG. 1 is a pictorial illustration of a preferred embodiment of the invention with a skillet generally shown on the cooking surface.
Figure 2:
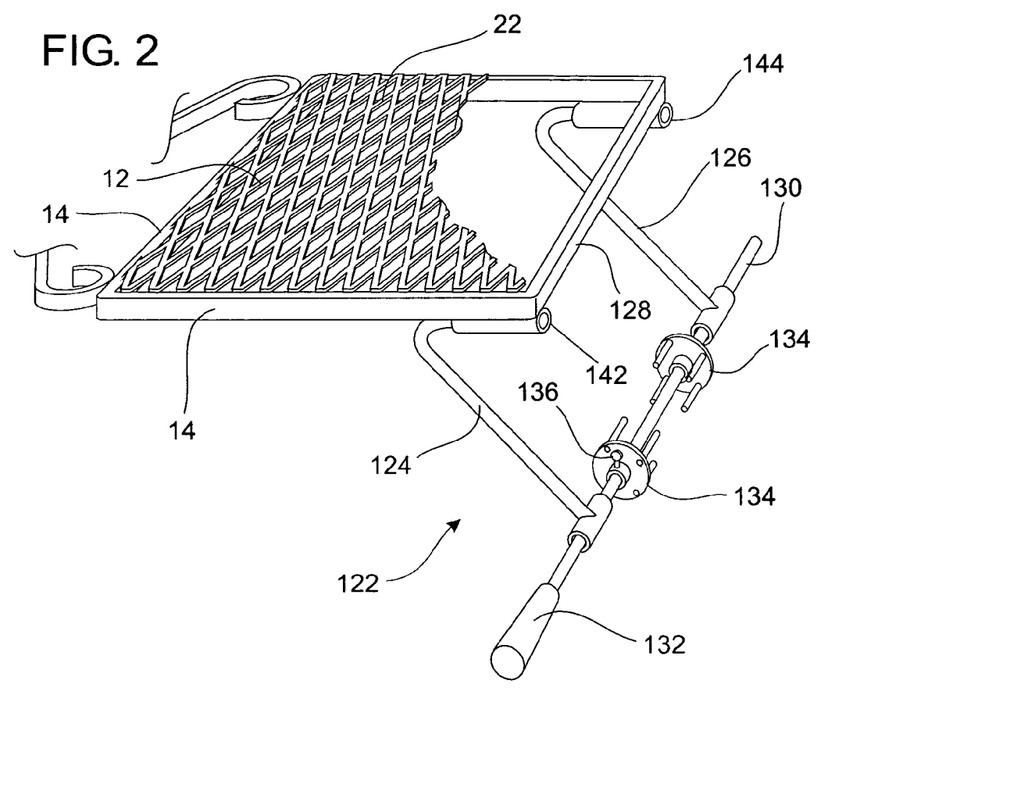
FIG. 2 is a pictorial illustration of a preferred embodiment of the invention shown generally disassembled.

Referring now to the drawings, wherein like reference numerals designate corresponding structure throughout the views, and referring in particular to FIG. 1, reference numeral 10 designates a preferred embodiment of a new and improved portable outdoor cooking apparatus, assembly, system, or kit in accordance with the current invention. The invention 10 generally comprises a cooking surface 12 generally attached to a frame 14. In a preferred construction, frame 14 includes a positioning ring 16 having aperture 17 wherein the cooking surface 12 is generally horizontally positioned over a heat or fire source 18 and held in a desired position by post 20 working in cooperation with frame 14 positioning ring 16.

Referring to the illustrations and in general FIGS. 1–7B, cooking surface 12 is generally flat, with a preferred embodiment being rectangular. It is understood that cooking surface 12 may be round, square, or rectangular having rounded corners or any multiple shapes that generally provide a generally flat cooking surface 12.

In a preferred embodiment, cooking surface 12 is generally comprised of wire mesh 22. It is understood that other types and shapes of material may be provided that essentially allow support of food items (not depicted) or cooking equipment 24 such as but not limited to pan 24. It also further understood that pan 24 may be supplied as part of invention 10 with a preferred embodiment working in conjunction with, removably attachable, or formed with cooking surface 12. It is also contemplated that a generally flat material without mesh (not depicted) may be provided such that cooking surface 12 may operate as griddle or frying surface. Still furthermore, wire mesh 22 may still be used as cooking surface 12 and work in conjunction with a separate griddle or frying surface 26 which will be discussed in greater detail below. Wire mesh 22 may be of numerous configurations such as but not limited to generally vertical bars with cross bars (not depicted) typical of the prior art grilling surfaces.

Post 20 is generally adapted to be secured in a generally vertical position 28 into ground 30. In a preferred embodiment, post 20 is positioned into ground at an angle 32 which will be discussed in greater detail below. It is contemplated that post 20 may have a first end 34 generally located at top 36 of post 20 and a second end 38 generally located at bottom 40 of post 20. A preferred embodiment may also include peg 42, which an operator (not depicted) may step on to push post 20 into ground 30 during set up. It is also contemplated that post 20 may be made from hollow metal tubing and generally cylindrical although other preferred embodiments may be wood, solid metal, non-cylindrical as well as other conventional construction. In a preferred embodiment, post 20 may be made from a first segment 44 which cooperatively joins to a second segment 46 by means of a split pin 48 generally locking with slot 50. Second end 38 of post 20 may be driven by hammering or pushed into ground 30 by stepping on peg 42 such that post 20 is secure. It is also contemplated that post 20 is generally positioned at angle 32 with ground 30 with a preferred angle being 75 degrees.

Figure 8:
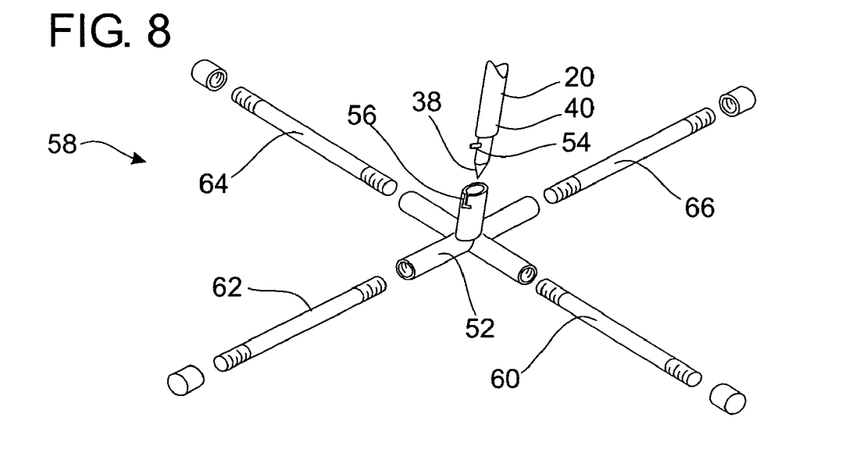
FIG. 8 is a perspective view of a preferred embodiment of the invention generally depicting a base partially disassembled.

Now generally referring to FIG. 8, in another preferred embodiment, the post 20 may be used in cooperation with base or stand 52. It is contemplated that invention 10 may be used in locations where ground 30 is unsuitable for hammering or driving post 20 such as but not limited to tailgate parties that might occur over concrete parking lots by example. Stand 52 may be joined to post 20 by means of a split pin 54 generally locking with slot 56 in stand 52. In a preferred embodiment stand 52 would generally be an X pattern 58 but is not limited to such. Stand 52 may further disassemble into segments 60, 62, 64, 66 and 68 for storage.

Frame 14 cooperatively joins with post 20 for positioning cooking surface 12 at the desired height over the heating source or fire 18. In a preferred embodiment, frame 14 generally attaches to or is integrally formed with cooking surface 12, provides the positioning ring 16 that cooperates with post 20, and has a handle segment 70 for raising and lowering cooking surface 12. It is contemplated that frame 14 is generally made from metal with a preferred construction having a first member 72 attached to cooking surface 12 generally at corner 74 and a second member 76 attached to cooking surface 12 generally at corner 78. First member 72 and second member 76 may generally be connected by a hinge segment 80, which will be discussed in greater detail below, positioning ring 16, which will also be discussed in greater detail below, and handle 82 generally positioned on handle segment 70.

It is contemplated that positioning ring 16 is generally round and may be tubular.

Positioning ring 16 aperture 17 diameter 84 should generally be of a slightly larger than post 20 outer diameter 86. In a preferred construction, positioning ring 16 aperture 17 diameter 84 is 15/16 of an inch and post 20 outer diameter 86 is 7/8 of an inch. Once the post 20 is set either in the ground 30 or in use with stand 52, the positioning ring 16 is slid down post 20 top 36 through aperture 17. It is understood that cooking surface 12 and frame 14 segment 88 should generally be heavier than frame 14 segment 90 and handle segment 70. It is further understood that gravity in cooperation with the angle of post 20 will allow positioning ring 16 to generally cooperate to position frame 14 and cooking surface 12 respective to post 20. To secure the cooking surface 12, the handle segment 70 of frame 14 is released and the weight differential will cause the frame 14 to generally frictionally engage post 20.

To adjust the height of cooking surface 12, the handle segment 70 is generally pushed in a downward movement relative to ground 30 in order to release the frictional engagement between the positioning ring 16 and post 20. To set the desired position, handle segment 70 is generally allowed to move upward relative to ground 30 until frictional engagement occurs.

Figure 9A:
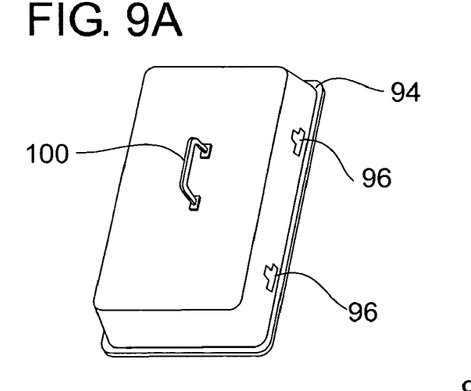
FIG. 9A is a perspective view of a preferred embodiment of the invention generally depicting a firebox cover.
Figure 9B:
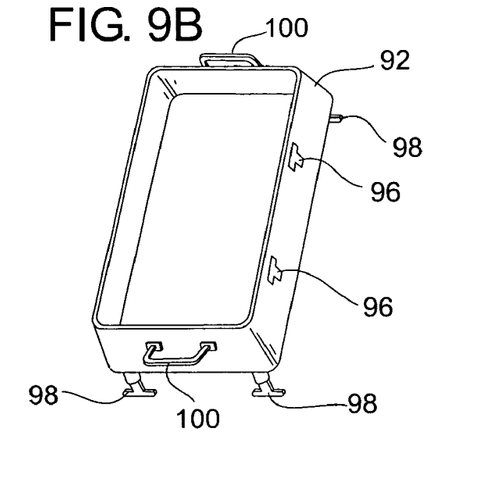
FIG. 9B is a perspective view of a preferred embodiment of the invention generally depicting a firebox.

Now with general reference to FIGS. 9A–9B, in another preferred embodiment, a prefabricated container or firebox 92 may be provided to hold fire source 18. Firebox 92 may be used where it is undesirable or impractical to make a fire pit such as tailgate parties in parking lots for example. In a preferred construction, firebox 92 may include a cover or lid 94 that may be selectively secured by snap locks 96. It is further contemplated that firebox 92 may have a hinged lid (not depicted). Still furthermore, in a preferred construction, firebox 92 may include legs 98 such that firebox 92 is relatively raised off ground 30, ventilation ports (not depicted), and may further include handles 100. Firebox 92 can be used in conjunction with charcoals, wood or other types of materials that may be used as a fire source 18 to provide heat for the cooking. The firebox 92 is generally positioned underneath cooking surface 12 and relatively adjacent to post 20.

Figure 10:
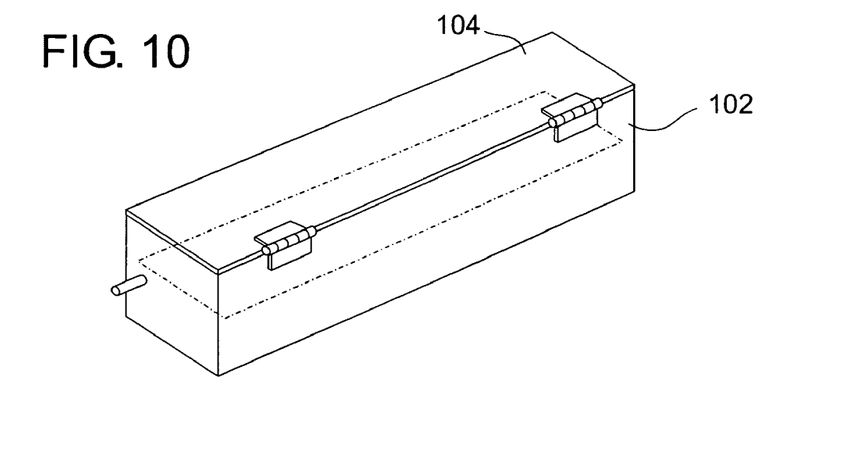
FIG. 10 is a perspective view of a preferred embodiment of the invention generally depicting a warming oven.

Once again referring to the drawings and FIG. 10 in particular, in another preferred embodiment, warming oven 102 may be included. In a preferred construction, warming oven 102 may generally be a box configuration that may or may not include a hinged lid 104.

Warming oven 102 may be placed on frame 14 such as but not limited to between post 20 and cooking surface 12. It is still further contemplated that warming oven 102 may be generally positioned below frame 14 by hanging (not depicted), sit on frame 14 between post 20 and handle segment 70, or on cooking surface 12.

Figure 11:
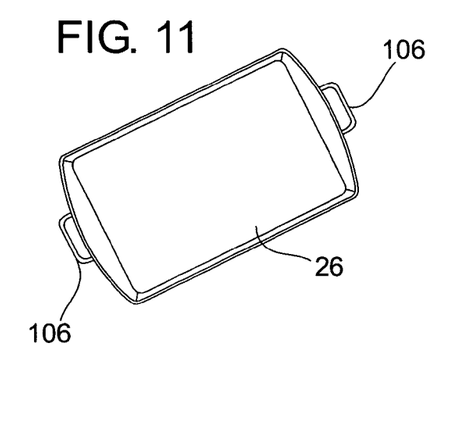
FIG. 11 is an elevational view of a preferred embodiment of the invention generally depicting a griddle which may work in conjunction with the cooking surface.

In FIG. 11, another preferred embodiment is generally depicted. A griddle or frying surface 26 utensil may be included wherein said griddle 26 generally may be placed on cooking surface 12. Griddle 26 may also include handles 106 and it is still further contemplated that attachment means (not depicted) of conventional nature may be used to hold griddle 26 in place.

Figure 12:
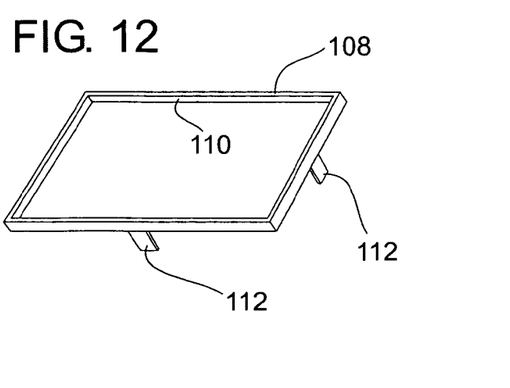
FIG. 12 is an elevational view of a preferred embodiment of the invention generally depicting a surround grill lip.

Still again referring to the drawing and in particular FIG. 12, in another preferred embodiment, a surround grill lip 108 may be included. It is contemplated that cooking surface 12 may be generally flat, it is contemplated that cooking surface 12 may be adapted by surround grill lip 108 such that a lip 110 is provided to reduce or prevent items, such as griddle 26, from slipping off cooking surface 12. In general, surround grill lip 108 would slide on top of cooking surface 12 and essentially add a raised portion or lip 110 above cooking surface 12. It is still further contemplated that frame 14 may integrally form a raised portion or lip (not depicted) such that surround grill lip 108 may not be needed. Surround grill lip 108 may include tabs 112 for holding, securing, or generally positioning over cooking surface 12.

Figure 13:
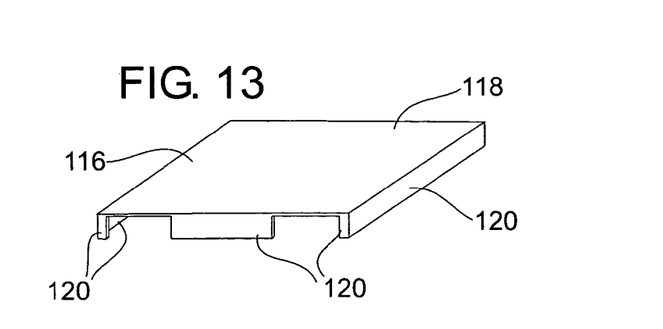
FIG. 13 is a perspective view of a preferred embodiment of the invention generally depicting a grill cover.

Referring now to FIG. 13 in general, in another preferred embodiment, grill cover 116 may be included. Grill cover 116 has generally a solid flat surface 118 used for cooking to be used in conjunction with cooking surface 12 wherein cooking surface 12 is made from wire mesh 22 or the like. It is understood that while cooking and preparing certain items, such as eggs, it is undesirable to cook upon wire mesh 22 or grill type surfaces. It is further understood that grill cover 116 may be made from metal and may further include a non-stick coating or material. Grill cover 116 may further include segments or tabs 120 for holding, securing, or generally positioning over cooking surface 12.

Figure 14:
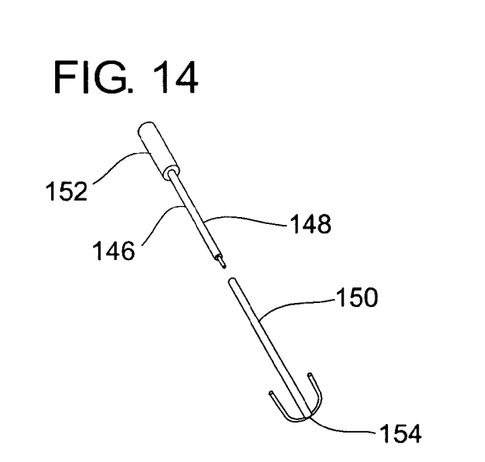
FIG. 14 is an exploded view of a preferred embodiment of the invention generally depicting a rotisserie assembly working in conjunction with the cooking surface.

Once again referring to the drawings and FIG. 14 in particular, it is contemplated invention 10 may include a rotisserie assembly 122. Rotisserie assembly 122 may include a first bracket 124 and a second bracket 126 which are generally attached to cooking surface 12 or frame 14 such that first bracket 124 and second bracket 126 generally hang from the front 128 of cooking surface 12 and or frame 14. In the preferred construction, rotisserie assembly 122 hangs below the cooking surface 12 and above the fire source 18. First bracket 124 and second bracket 126 work in cooperation to support rod 130 wherein rod 130 may be freely and selectively rotated by an individual. Rod 130 may include a handle 132, positional sliding prongs 134. It is contemplated that sliding prongs 134 may generally be used to secure food items and further include set screws 136 for relatively securing position along rod 130. It is further contemplated that rod 130 may be generally formed form multiple and attachable segments (not depicted) so that it may be disassembled into smaller pieces for transportation and that handle 132 may be of other configurations such as a general L shape (not depicted) to maximize rotation per work expended by an operator.

Referring to the drawings and FIG. 14 in particular again, cooking surface 12 may include a first receiver 138 and second receiver 140 wherein both are respectively cylindrically tubular and generally positioned on front 128 of cooking surface with preferred embodiment placing respectively on corner 142 and 144. It is understood that frame 14 may integrally form first receiver 138 and second receiver 140, that they may be removably attached, or of varying shape other than cylindrical such as but not limited to generally square tubing. In a preferred construction, first bracket 124 and second bracket 126 respectively removably attach to first receiver 138 and second receiver 140 when it is desired to use rotisserie assembly 122.

Figures 3, 4, 5, 6:
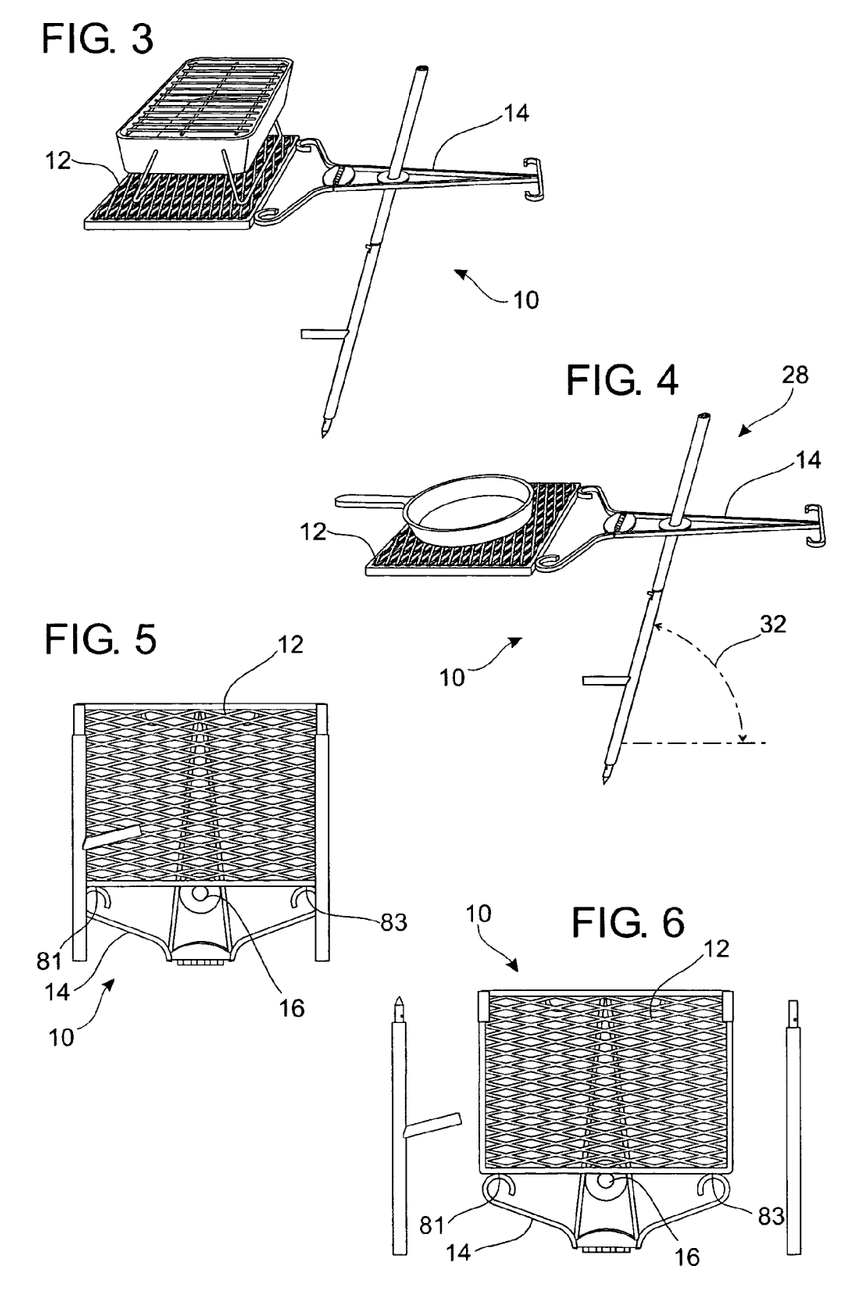
FIG. 3 a pictorial illustration of a preferred embodiment of the invention showing use as a general stand or table holding a charcoal grill.
FIG. 4 is a pictorial illustration of a preferred embodiment of the invention with a skillet generally shown on the cooking surface.
FIG. 5 is a pictorial illustration of a preferred embodiment of the invention generally partially disassembled and partially folded.
FIG. 6 is a pictorial illustration of a preferred embodiment of the invention generally partially disassembled and partially folded.
Figure 7A:
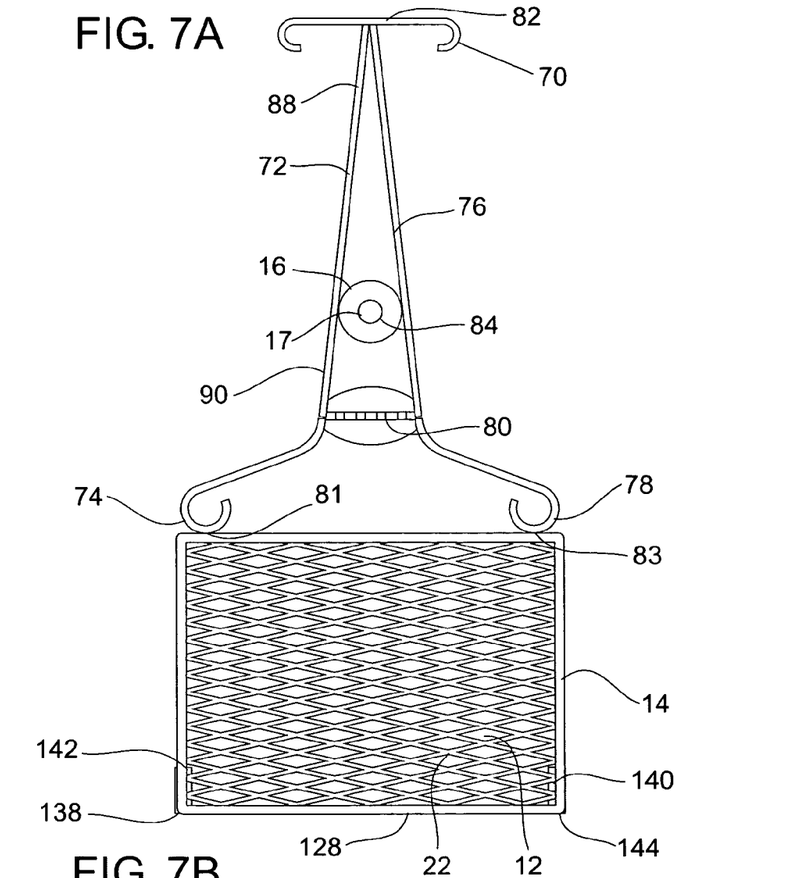
FIG. 7A is an elevational view of a preferred embodiment of the invention generally partially disassembled.
Figure 7B:
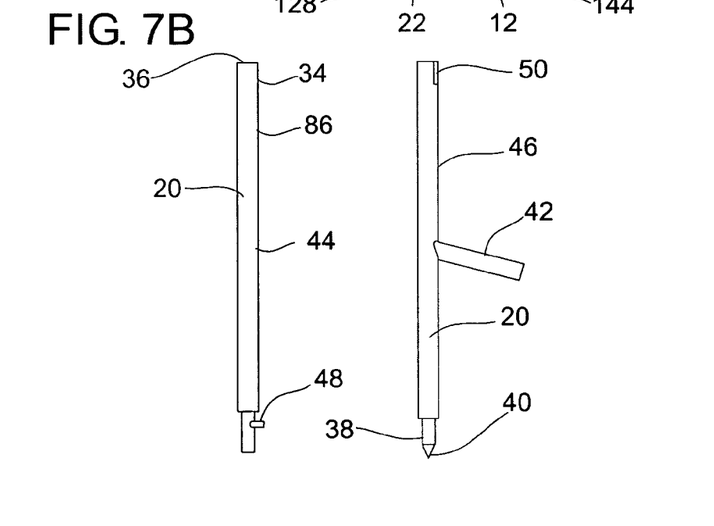
FIG. 7B is an exploded view of a preferred embodiment of the invention generally depicting a post partially disassembled.

Still furthermore and referring to FIG. 5 and FIG. 14, in a preferred construction, first receiver 138 and second receiver 140 may be used to removably store post 20 wherein first segment 44 generally may be inserted into first receiver 138 and second segment 46 may be inserted into second receiver 140 for transportation and carrying. First receiver 138 and second receiver 140 may generally be the same shape for cooperatively holding for storage and transportation post 20 when post 20 is disassembled. A preferred construction of first receiver 138 and second receiver 140 is generally cylindrical.

Likewise, it is contemplated that frame 14 may be foldably constructed wherein hinge segment 80 may be included. It is understood that hinge segment 80 placement is generally in a fashion that while cooking surface 12 is attached to post 20, hinge segment 80 is generally in a locked position. Furthermore, it is understood that hinge segment 80 may consist of one or more hinges and it is generally provided to allow frame 14 to essentially fold flat against cooking surface 12 for storage and transportation. In a preferred construction, hinge segment 80 may comprise first hinge 81 and second hinge 83 as well or in the alternative.

Figure 15:
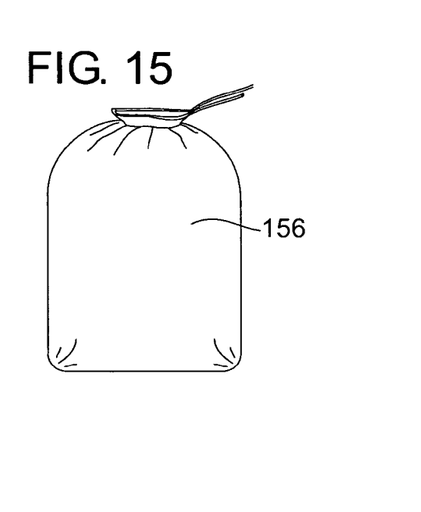
FIG. 15 is an exploded view of a preferred embodiment of the invention generally depicting a cooking utensil partially dissassembled.

Now generally referring to FIG. 15, in another preferred embodiment, invention 10 may also include a hotdog or cooking stick 146. It is contemplated that stick 146 may be formed from a first segments 148 which is generally removably attachable to a second segment 150 for breaking down for transportation. It is understood that stick 146 may be formed of several smaller pieces for breaking down into a more compact form. Stick 146 may include handle 152, and prong assembly 154 that are generally facing backwards for safety purposes.

Figure 16:
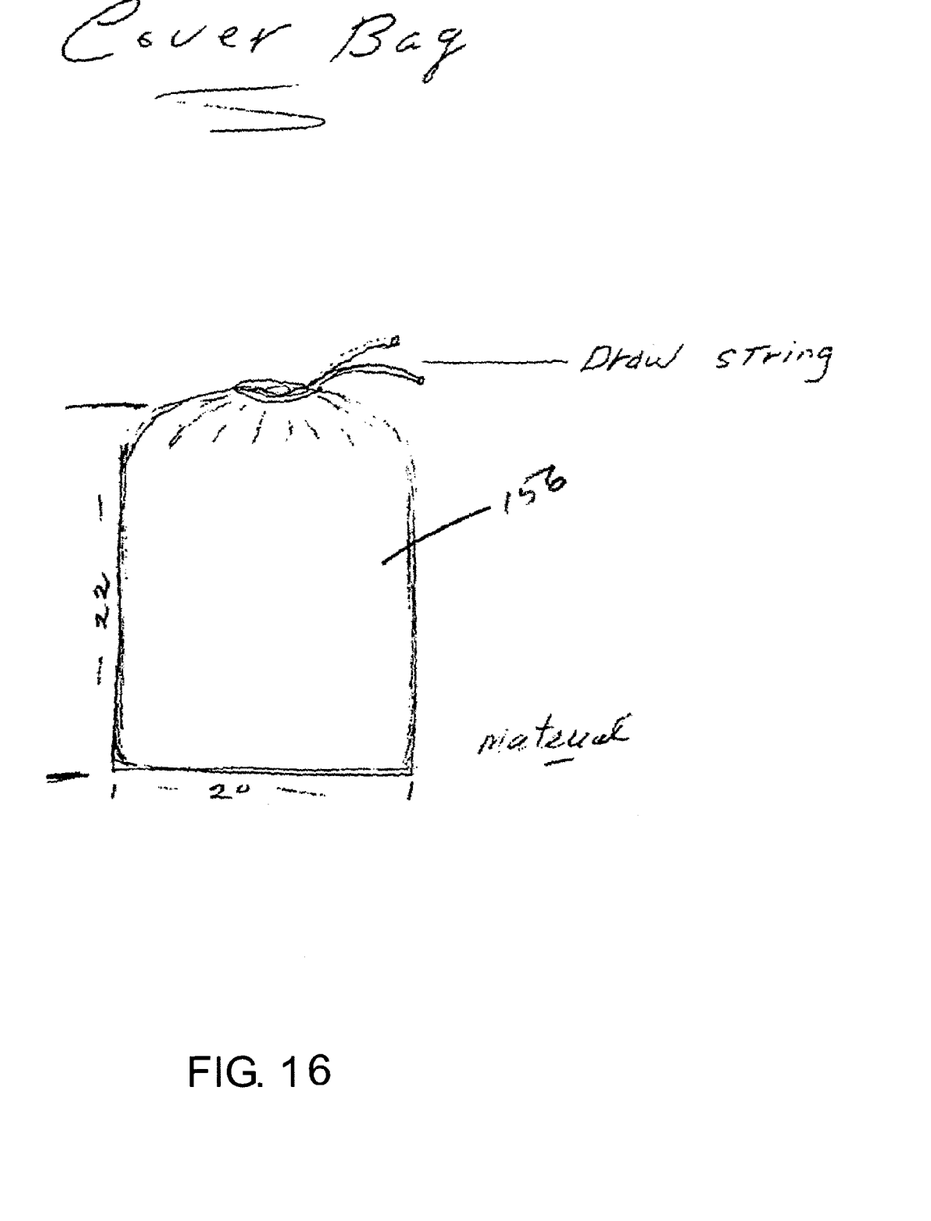
FIG. 16 is a perspective view of a preferred embodiment of the invention generally depicting a storage container.

Referring to FIG. 16, it is contemplated that a storage container 156 may be included. Storage container may be made from cloth, plastic, canvass, and other traditional relatively soft materials. It is further contemplated that frame 14 may be generally folded along hinge segment 80 such that embodiment may be stored in storage container 156 along with other preferred embodiments of accessories.

Referring once again to the figures and specifically FIG. 3, cooking surface 12 may act as a generally positionable table 158 with an adjustable height. Table 158 could be used to place other types of prior art grills 160, or generally used as utility surface for food preparation, work station, drying rack, and so forth. It is still further contemplated that invention 10 may be used as a seat with an adjustable height.

A preferred embodiment of a portable outdoor cooking apparatus may comprise a cooking surface having a first receiver and a second receiver, a frame hingedly attached to said cooking surface wherein said frame comprises a positioning ring and a handle and said handle weighs less than said cooking surface, and a post comprising a first segment and a second segment wherein said first segment removably attaches for storage to said cooking surface first receiving port and said second segment removably attaches to said cooking surface second receiving port for storage and wherein said first segment and said second segment removbaly attach to form said post, and said post removably attaches to said positioning ring to position said cooking surface along said post.

Another preferred embodiment of the portable outdoor cooking apparatus may have post first segment that removably attaches to a stand, said post first segment further includes a peg for an operator to step on to secure said post first segment into ground, said post is cylindrical.

Still another may include a rotisserie assembly having a first bracket and a second bracket wherein said first bracket removably attaches to said cooking surface first receiver and said second bracket removably attaches to said cooking surface second receiver and wherein said first bracket and said second bracket cooperatively hold a rod wherein food may be positioned on said rod for cooking.

Another preferred embodiment of a portable outdoor cooking kit may comprise a cooking surface having a first receiver and a second receiver and wherein said cooking surface is hingedly and foldably connected to a frame comprising a handle and a positioning ring, a post comprising a detachable first segment wherein said first segment may be removably attached to said cooking surface first receiver, a detachable second segment wherein said second segment may be removably attached to said cooking surface second receiver, and said post may operatively attach to said positioning ring.

It may further include a stand wherein said stand may removably attach to said post, a rotisserie assembly wherein said rotisserie assembly may removably attach to said cooking surface first receiver and second receiver, a warming oven wherein said warming oven may removably sit on said cooking surface frame, a griddle wherein said griddle may be rmovably positioned on said cooking surface, a surround grill lip wherein said surround grill lip may removably attach to said cooking surface to prevent items from slipping off said cooking surface, a grill cover wherein said grill cover may removably attach to said cooking surface, a fire box wherein said fire box may provide a container for holding a fire for cooking under said cooking surface, and a storage container for storage and transportation of said portable outdoor cooking kit.

It is also understood that elements described above are generally made from metal, although it may be contemplated that some specific elements may be made of wood, plastic and other conventional construction materials known in the art. Whereas, the present invention has been described in relation to the drawings, illustration and pictures attached hereto, it should be understood that other and further modifications, apart from those shown or suggested herein, may be made within the spirit and scope of this invention.

What is claimed is:

1. A portable outdoor cooking apparatus comprising:
   a cooking surface having a first receiver and a second receiver;
   a frame hingedly attached to said cooking surface wherein said frame comprises a positioning ring and a handle and said handle weighs less than said cooking surface; and
   a post comprising a first segment and a second segment wherein said first segment removably attaches for storage to said cooking surface first receiving port and said second segment removably attaches to said cooking surface second receiving port for storage and wherein said first segment and said second segment removably attach to form said post, and said post removably attaches to said positioning ring to position said cooking surface along said post.

2. The portable outdoor cooking apparatus of claim 1 wherein said post first segment removably attaches to a stand.

3. The portable outdoor cooking apparatus of claim 1 wherein said post first segment further includes a peg for an operator to step on to secure said post first segment into ground.

4. The portable outdoor cooking apparatus of claim 3 wherein said post is cylindrical.

5. The portable outdoor cooking apparatus of claim 1 further including a rotisserie assembly having a first bracket and a second bracket wherein said first bracket removably attaches to said cooking surface first receiver and said second bracket removably attaches to said cooking surface second receiver and wherein said first bracket and said second bracket cooperatively hold a rod wherein food may be positioned on said rod for cooking.

6. A portable outdoor cooking kit comprising:
   a cooking surface having a first receiver and a second receiver and wherein said cooking surface is hingedly and foldably connected to a frame comprising a handle and a positioning ring;
   a post comprising a detachable first segment wherein said first segment may be removably attached to said cooking surface first receiver, a detachable second segment wherein said second segment may be removably attached to said cooking surface second receiver, and said post may cooperatively attach to said positioning ring.

7. The portable outdoor cooking kit of claim 6 further including a stand wherein said stand may removably attach to said post.

8. The portable outdoor cooking kit of claim 7 further including a rotisserie assembly wherein said rotisserie assembly may removably attach to said cooking surface first receiver and second receiver.

9. The portable outdoor cooking kit of claim 8 further including a warming oven wherein said warming oven may removably sit on said cooking surface frame.

10. The portable outdoor cooking kit of claim 9 further including a griddle wherein said griddle may be removably positioned on said cooking surface.

11. The portable outdoor cooking kit of claim 10 further including a surround grill lip wherein said surround grill lip may removably attach to said cooking surface to prevent items from slipping off said cooking surface.

12. The portable outdoor cooking kit of claim 11 further including a grill cover wherein said grill cover may removably attach to said cooking surface.

13. The portable outdoor cooking kit of claim 12 further including a firebox wherein said firebox may provide a container for holding a fire for cooking under said cooking surface.

14. The portable outdoor cooking kit of claim 13 further including a storage container for storage and transportation of said portable outdoor cooking kit.

* * * * *